United States Patent [19]

Weeks, Jr. et al.

[11] Patent Number: 5,244,748
[45] Date of Patent: Sep. 14, 1993

[54] METAL MATRIX COATED FIBER COMPOSITES AND THE METHODS OF MANUFACTURING SUCH COMPOSITES

[75] Inventors: Joseph K. Weeks, Jr.; Chantal Gensse, both of Salt Lake City, Utah

[73] Assignee: Technical Research Associates, Inc., Salt Lake City, Utah

[21] Appl. No.: 303,442

[22] Filed: Jan. 27, 1989

[51] Int. Cl.$^5$ .............................. B21B 39/00
[52] U.S. Cl. .................... 428/614; 428/381; 428/384; 427/250; 427/255.7; 204/181.1; 204/181.2
[58] Field of Search ............. 428/614, 381, 384; 204/20, 27, 28, 38.1, 38.6, 40, 42, 181.1, 181.2; 427/250-253

[56] References Cited

U.S. PATENT DOCUMENTS

| | | | |
|---|---|---|---|
| 3,356,525 | 12/1967 | Miyamura | 117/46 |
| 3,553,820 | 2/1967 | Sara | 428/614 |
| 3,704,485 | 12/1972 | Hall | 19/65 |
| 3,720,257 | 3/1973 | Beutler et al. | 428/614 |
| 3,818,588 | 6/1974 | Bates | 29/630 |
| 3,827,129 | 8/1974 | Denham et al. | 29/419 |
| 3,833,402 | 9/1974 | Elban et al. | 117/46 |
| 3,860,443 | 1/1975 | Lachman et al. | 117/106 |
| 3,953,647 | 4/1976 | Brennan et al. | 428/378 |
| 4,012,204 | 3/1977 | Riewald et al. | 428/614 |
| 4,060,412 | 11/1977 | Divecha | 75/203 |
| 4,157,409 | 6/1979 | Levitt et al. | 427/299 |
| 4,223,075 | 9/1980 | Harrigan et al. | 428/610 |
| 4,341,823 | 7/1982 | Sexton et al. | 428/614 |
| 4,351,878 | 9/1982 | Harper-Tervet | 428/367 |
| 4,376,803 | 3/1983 | Katzman | 428/408 |
| 4,678,820 | 7/1987 | Pike | 523/200 |
| 4,737,382 | 4/1988 | Katzman | 427/228 |
| 4,853,294 | 8/1989 | Everett et al. | 428/614 |
| 4,944,904 | 7/1990 | Singh et al. | 269/60 |

FOREIGN PATENT DOCUMENTS

| | | |
|---|---|---|
| 86-306403.4 | 5/1987 | European Pat. Off. |
| 2727683 | 12/1978 | Fed. Rep. of Germany |
| 2048501 | 10/1975 | Japan |
| 51-81703 | 7/1976 | Japan |
| 57-101627 | 6/1982 | Japan |
| 58-31167 | 2/1983 | Japan |
| 59-19087 | 1/1984 | Japan |
| 61-257439 | 11/1986 | Japan |
| 61-257440 | 11/1986 | Japan |
| 62-133030 | 6/1987 | Japan |
| 62-176662 | 8/1987 | Japan |
| 1485896 | 9/1977 | United Kingdom |
| 2112827 | 7/1983 | United Kingdom |

OTHER PUBLICATIONS

Levitt, A. P. et al. "Fabrication and Properties of Graphite Fiber Reinforced Magnesium", Metallurgical Trans., 2456, vol. 3, Sep. 1992.

Gupta, V. et al., "Interfaces with Controlled Toughness as Mechanical Fuses to Isolate Fibres from Damage," Massachusetts Institute of Technology, Cambridge, MA., pp. 2031-2040.

Nieh, T. G. et al., "Carbide Coatings on Graphite Fibers by Liquid Metal Transfer Agent Method," Journal of the American Ceramic Society, vol. 65, No. 5, May 1982, pp. 227-230.

*Primary Examiner*—Donald P. Walsh
*Assistant Examiner*—Ngoclan T. Mai
*Attorney, Agent, or Firm*—Workman, Nydegger & Jensen

[57] ABSTRACT

A fiber coating which allows ceramic or metal fibers to be wetted by molten metals is disclosed. The coating inhibits degradation of the physical properties caused by chemical reaction between the fiber and the coating itself or between the fiber and the metal matrix. The fiber coating preferably includes at least a wetting layer, and in some applications, a wetting layer and a barrier layer between the fiber and the wetting layer. The wetting layer promotes fiber wetting by the metal matrix. The barrier layer inhibits fiber degradation. The fiber coating permits the fibers to be infiltrated with the metal matrix resulting in composites having unique properties not obtainable in pure materials.

18 Claims, 8 Drawing Sheets

METAL MATRIX COATED FIBER COMPOSITES AND THE METHODS OF MANUFACTURING SUCH COMPOSITES

GOVERNMENT RIGHTS

The present invention was developed at least in part pursuant to support received from the United States Department of Energy through Contract No. DE-AC02-87ER80504, and the Government of the United States of America has certain nonexclusive rights pursuant to those cooperative agreements.

BACKGROUND

1. The Field of the Invention

The invention relates to metal matrix coated fiber composites and methods of manufacturing such composites. More particularly, the present invention provides a fiber coating which allows ceramic or metal fibers to be wet by molten metals without degradation of the fiber by the coating itself or the metal matrix. The coated fibers may be infiltrated with the metal matrix resulting in composites having improved properties such as strength, stiffness (elastic modulus), wear resistance, hardness, thermal expansion coefficient, or thermal conductivity not obtainable in pure materials.

2. Technology Review

A. Metal Matrix Composites

A "composite" is a material consisting of one phase dispersed in a continuous matrix. Composites are commonly divided into three classes, based on the types of materials used for the matrix: polymers, metals, and ceramics.

In the field of metal matrix composites, a metal matrix is reinforced with particulates or fibers to improve properties such as strength, stiffness (elastic modulus), wear resistance, hardness, thermal expansion coefficient, or thermal conductivity. Metal matrix composites typically have better high temperature resistance than composites based upon polymers, and have better high temperature oxidation resistance than carbon-carbon composites.

The most widely known composite system is tungsten carbide used in many cutting tools. The composite is formed by dispersing fine tungsten carbide powder within a cobalt metal binder. This composite is successful because of its excellent physical properties, such as hardness, wear resistance, and toughness, as well as ease of manufacture. In the manufacturing process, molten cobalt wets the tungsten carbide powder. The wetting of the tungsten carbide is essential to the process of turning cold-pressed porous parts into dense, tough cutting tools.

In the area of metal matrix composites reinforced with fibers, the reinforcing fibers are typically either metals or ceramics The particular advantage of fiber reinforcement is that they can be aligned in the composite to improve strength, stiffness, wear resistance, hardness, thermal expansion coefficient, or thermal conductivity in the places and directions which are needed. Examples of metal fibers include tungsten, molybdenum, steel, and boron. Ceramic fibers which are currently in use include graphite, silicon carbide, alumina.

B. Metal Fiber Reinforced Composites

Unlike most ceramic fibers, metal fibers are generally wetted by the metal matrix in which the fiber is being incorporated. As a result, conventional casting techniques can be used to infiltrate a bundle of metal fibers. For example, copper and silver have long been known to wet refractory metals such as tungsten and molybdenum. Some of the early rocket nozzles which were used in the 1960's consisted of a porous tungsten infiltrated with silver; the silver evaporated from the surface of the nozzle, cooling the nozzle in the process. More recently, researchers have been working on a tungsten fiber reinforced copper matrix composite and on iron-based superalloys reinforced with tungsten fibers for high temperature applications.

One of the major problems with metal fibers reinforcing a metal matrix being encountered by researchers is the potential reaction and degradation of the metal fibers by the matrix material. For example, in attempting to reinforce nickel superalloys with tungsten fibers, the tungsten reacts with the matrix causing the tungsten to recrystallize and lose much of its strength.

In metal systems, it is desirable to have a strong bond between the fibers and the matrix. However, many of the reactions which cause bonding also cause degradation of the fibers. Fiber degradation significantly reduces some desirable fiber properties such as strength or stiffness, thereby defeating the purpose for using the metal fibers in the composite.

C. Ceramic Fiber Reinforced Composites

Unlike metal reinforcements, most ceramic reinforcements are not wetted by molten metals. In order to produce ceramic fiber reinforced composites, the most common approach is to infiltrate the fibers with the molten metal matrix under high pressure. In this case, fiber wetting is unnecessary, and bonding between the fiber reinforcement and the metal matrix is strictly physical. This process is often referred to as "squeeze casting."

From an engineering standpoint, handling molten metal under high pressure is difficult. A major problem with high pressure consolidation or squeeze casting is that two fibers pressed close together form a capillary which tends to exude molten metal. If a series of fibers are close together, the resulting voids between the fibers can degrade transverse strength such that the fibers lose their ability to withstand transverse stress.

In addition, because the fibers are not wetted by the metal matrix, only mechanical forces couple the fibers to the metal matrix. These "bonding" forces are weak because there is not atom-atom covalent bonding.

Some manufacturers currently roll metal powders into graphite fibers to produce fiber-metal tapes. A variation of this approach is used by others, in which copper electroplated on graphite fibers are hot pressed into simple shapes. Further research is currently focusing on aluminum-based composites using the high pressure metal approach.

A fundamental problem with high pressure consolidation is that large parts can only be formed with difficulty. For example, the recommended consolidation cycle for the copper plated graphite fibers is 1000 psi pressure at 750° C. for 20 minutes.

Another significant problem with copper/graphite composites formed by high pressure consolidation is that the copper dewets from the fiber surface upon exposure to high temperatures. Hutto et al., "Development of Copper-Graphite Composites from Metal Coated Carbon Fibers," 31*st International SAMPE Symposium* 1145-1153, Apr. 7-10, 1986. This dewetting is graphically illustrated in FIG. 1 which shows molten copper beading on a graphite fiber. The beading is evidence that molten copper does not wet graphite.

The alternative to high pressure consolidation is infiltration of the reinforcing fibers with molten metal. In this case, wetting of the fibers by the molten metal is necessary. If the metal wets the fibers, the capillary action of the fibers draws the metal into the fiber preform, making it feasible to use techniques similar to metal casting to produce large scale quality composites. The technical background for producing metal matrix composites by liquid infiltration was recently reviewed by Delannay et al., "The Wetting of Carbon by Copper and Copper Alloys," *Journal of Materials Sciences* 149-155 (1987). An additional advantage of liquid metal infiltration is chemical bonding between the fiber and the matrix (as opposed to mechanical bonding in squeeze casting), potentially leading to improved physical composite properties.

In order to infiltrate the reinforcing fibers with molten metal, the fibers must be wet by the molten metal. As discussed above, ceramic fibers are generally not wet by molten metals of the type used as a composite matrix. There are two approaches which have been suggested in the art for improving the wettability of ceramic fibers. The first attempted solution to the problem is to coat the ceramic surface with a chemical layer which promotes wetting. The other approach which has been attempted by those in the art has been to develop an alloy matrix material which will wet the ceramic fiber.

Ceramic fibers are sensitive to surface damage; thus, if the metal matrix reacts with the fiber, then serious loss of fiber strength is likely to result. To prevent reactions between the metal matrix and the fiber, as well as to improve bonding, those skilled in the art have attempted to chemically coat the fibers. Various known coating techniques are discussed below.

Lightweight metals, particularly magnesium, aluminum, and titanium are of interest as matrix materials because of their low density. Wetting of graphite fibers in a magnesium metal matrix has been enhanced by coating the graphite fibers with silica. The magnesium reacts with silica which causes the fibers to be wetted. Fortunately, magnesium does not form stable carbides so there is no reaction between the graphite fibers and the magnesium matrix which would reduce the strength of the graphite fiber.

Current efforts to reinforce aluminum have involved attempts to incorporate silicon carbide fibers, graphite fibers, or alumina fibers into an aluminum matrix. Silicon carbide is thermodynamically unstable in contact with aluminum due to the following reaction:

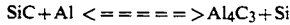

$$SiC + Al \Longleftrightarrow Al_4C_3 + Si$$

If the aluminum alloy contains 8% to 12% Si metal (depending on the temperature of the molten alloy), the decomposition of the silicon to form aluminum carbide is prevented.

When alumina is the fiber, there is a problem because alumina is not wetted by molten aluminum. However, wetting has been enhanced by treating the alumina fiber surface with silica. It has also been found that alumina may be wetted by an aluminum alloy which contains magnesium. Since both alumina and silicon carbide are electrical insulators, composites made with them do not suffer from electrochemical corrosion. For example, in recent years, Toyota has been manufacturing composite aluminum diesel pistons by high pressure liquid metal infiltration of an alumina-silica fiber preform.

There has also been substantial current research in preparing aluminum/graphite composites. Early processes included treating the graphite fibers with molten sodium to enhance wetting. Unfortunately, molten sodium degraded the graphite fibers. Hence, those skilled in the art have tried to coat the graphite fibers by chemical vapor deposition ("CVD") with a titanium boron coating prior to liquid metal infiltration by the aluminum. However, the titanium boron coating is not air stable. Even short exposure to air causes the titanium boron coating to lose effectiveness in enhancing wetting of molten metals.

Other researchers have examined coatings on graphite to produce copper/graphite composites. While nickel coatings have been wetted by copper, the copper readily dissolves the nickel layer. Dissolution of the nickel layer adds impurities to the pure copper, thereby significantly reducing conductivity. Moreover, molten copper dewets from the graphite fiber surface so that the copper matrix is not continuous. This dewetting of copper from the graphite fiber prevents the formation of true copper/graphite composites.

Other researchers have attempted to wet graphite fibers by using metal alloys as the matrix metal. Gwen L. Stahl, "The Influence of Alloy Additions on the Wettability of Graphite by Copper," Metallurgical and Welding Engineering Dept., Calif. Polytechnic State Univ., San Luis Obispo, Calif., (unpublished manuscript, October 1985). Stahl found that a twenty percent (20%) titanium copper alloy would wet silicon carbide coated fibers, but that a ten percent (10%) titanium copper alloy produced no wetting of the silicon carbide coated fibers.

In addition, it has been found that the alloy components must be carefully selected to avoid reacting with the fibers resulting in fiber degradation. For example, alloy components which promote fiber wetting often react with the fiber causing fiber degradation, thereby limiting the practical usefulness of the metal matrix alloy.

Titanium boron coatings on graphite fibers, discussed above, have been wetted by molten copper. Nonetheless, the coating must not be exposed to air prior to infiltration. This undesirable feature renders titanium boron coatings impractical for many industrial scale applications.

D. Comparison of Ceramic and Metal Reinforcements

If has been found that metal reinforcements can be more easily wetted by molten metals than can ceramic reinforcements. Also, the metal wires tend to have greater ductility than ceramic reinforcements. Ceramic reinforcements, however, have several key advantages over metal reinforcements.

Ceramic fibers have similar strength levels to metal fibers, but ceramic fibers have densities one half to one tenth (0.5 to 0.1) of metal fibers. This results in specific strengths between two (2) and ten (10) times greater than metal fibers.

Moreover, ceramic fibers, particularly those made of graphite, have a higher elastic modulus than metal fibers, resulting in stiffer composites. Ceramic fibers have lower coefficients of thermal expansion, thereby resulting in composites which have more stable dimensions when subjected to thermal cycling. The pitch-based graphite fibers have very high thermal conductivity along the fiber axis, enabling composites to be produced with superior thermal properties. Finally, ceramic fibers, particularly those based upon graphite, have high temperature properties which are superior to those of other reinforcements.

Based upon these properties, a preferred fibrous reinforcement would have the ease of manufacture of metal fibers (wettable by molten metal) and the density and strength properties of ceramic fibers.

From the foregoing, it will be appreciated that what is needed in the art are metal matrix coated fiber composites and methods of manufacturing such composites in which the fibers are not degraded during processing, the process and various components are stable in air, the process operates at atmospheric pressure, and the process in amenable to standard metal casting techniques.

Additionally, it would be a significant advancement in the art to provide metal matrix coated fiber composites and methods of manufacturing such composites in which the fiber is coated with a refractory metal layer (1) which is readily wetted by the metal matrix, (2) which is substantially inert to the fiber, (3) which would have a higher melting point than the metal matrix so that the coating itself does not have to wet the fiber and does not decrease the temperature range over which the resulting composite can operate, (4) which has little or no solubility in the metal matrix, both to maintain the desired chemical properties of the metal matrix, as well as to prevent gradual dewetting of the fibers by slow degradation of the coating, (5) which has a strong bond to both the fiber and the metal matrix to prevent fiber pull-out or other degradation of the physical properties of the resulting composite, and (6) which is stable in air.

It would be another advancement in the art to provide metal matrix coated fiber composites and methods of manufacturing such composites in which the fiber is coated with a barrier layer (1) which is inert to the fiber, (2) which resists diffusion through or alloying with the refractory metal layer and inhibits diffusion of the refractory metal therethrough, and (3) which has good bonding between the fiber and the refractory metal in order to maximize the physical properties of the composite.

Such metal matrix coated fiber composites and methods of manufacturing such composites are disclosed and claimed herein.

BRIEF SUMMARY AND OBJECTS OF THE INVENTION

The present invention is directed to a fiber coating which allows ceramic or metal fibers to be wetted by molten metals. The coating also inhibits degradation of the physical properties of the fiber by the coating itself or by the molten metal. In addition, the coating does not appear to have any limiting effect upon the properties of the resulting composites. Hence, the fiber coatings within the scope of the present invention not only improve the wettability of the fiber, but also protect the fiber from degradation.

The fiber coating within the scope of the present invention preferably includes at least a wetting layer, and in some applications, a wetting layer and a barrier layer between the fiber and the wetting layer.

The wetting layer preferably comprises a very thin layer of a refractory metal. The refractory metal is chosen to be wetted by the molten matrix alloy but to have limited solubility in the alloy. Suitable refractory metals include molybdenum, tungsten, tantalum, or niobium. Depending upon the fiber or metal matrix, one may be preferred over another. These refractory metals have a melting point higher than the typical metal matrix and are generally inert with respect to the metal matrix.

In metal matrix composites applications where there is the potential for chemical interaction between the fiber and the wetting layer or the metal matrix, the fiber coating preferably includes both a wetting layer and a barrier layer.

The barrier layer is applied directly on the fiber and the wetting layer is applied on top of the barrier layer. The barrier layer protects the fiber from the wetting layer and/or from the molten metal matrix. In addition, it has also been found that in most cases the barrier layer tends to facilitate coating the fiber with the wetting layer.

A wide range of suitable barrier layer materials within the scope of the present invention have been discovered. For example, depending on the choice of fiber, suitable barrier layers may include oxides (such as alumina or silica), carbides (such as silicon carbide or titanium carbide), nitrides, (such as silicon nitride or titanium nitride), or even some metals. These barrier layers are stable in air and some may be readily applied to the fibers using techniques known in the art at low or atmospheric pressure.

The coatings within the scope of the present invention may be advantageously used in connection with certain metal matrix composites reinforced with either ceramics or metals. For example, the coatings may be applied to metal reinforced composites in those cases where there is chemical interaction between the metal matrix and the metal reinforcement. Similarly, the coating system may be applied to ceramic reinforcements which are degraded by the metal matrix or which are not wetted by the metal matrix.

The resulting composites within the scope of the present invention are useful for structural applications where their high strength and high modulus are useful. By varying the amount of ceramic fiber in a composite, the coefficient of thermal expansion can be controlled over a fairly wide temperature range. Such composites with controlled thermal expansion may be useful as materials to join metals and composites or ceramics.

A particular advantage of preparing parts by liquid metal infiltration is that fiber preforms, similar to the shape of the desired finished part may be infiltrated by a process similar to casting. This allows relatively massive composite parts to be produced. In the case of ceramic fiber reinforced metal matrix composites, bending or forming the final composite after infiltration may result in fracture of the ceramic fiber. Thus, liquid metal infiltration is preferred for forming large composite parts.

It is, therefore, an object of the present invention to provide metal matrix coated fiber composites and methods of manufacturing such composites in which the fibers are not degraded during processing, the process and various components are stable in air, the process operates at atmospheric pressure, and the process in amenable to standard metal casting techniques.

Another important object of the present invention is to provide metal matrix coated fiber composites and methods of manufacturing such composites in which the fiber is coated with a refractory metal layer (1) which is readily wetted by the metal matrix, (2) which is substantially inert to the fiber, (3) which would have a higher melting point than the metal matrix so that the coating itself does not have to wet the fiber and does not decrease the temperature range over which the resulting composite can operate, (4) which has little or no solubility in the metal matrix, both to maintain the desired chemical properties of the metal matrix, as well as to prevent gradual dewetting of the fibers by slow degradation of the coating, (5) which has a strong bond to both the fiber and the metal matrix to prevent fiber pull-out or other degradation of the physical properties of the resulting composite, and (6) which is stable in air.

An additional important object of the present invention is to provide metal matrix coated fiber composites and methods of manufacturing such composites in which the fiber is coated with a barrier layer (1) which is inert to the fiber, (2) which resists diffusion through or alloying with the refractory metal layer and inhibits diffusion of the refractory metal therethrough, and (3) which has good bonding between the fiber and the refractory metal in order to maximize the physical properties of the composite.

These and other objects and features of the present invention will become more fully apparent from the following description and appended claims, taken in conjunction with the accompanying drawings, or may be learned from the practice of the invention.

BRIEF DESCRIPTION OF THE DRAWINGS

FIG. 1 is typical of prior art attempts to coat graphite fibers with copper.

DETAILED DESCRIPTION OF THE PREFERRED EMBODIMENTS

Figure 1:
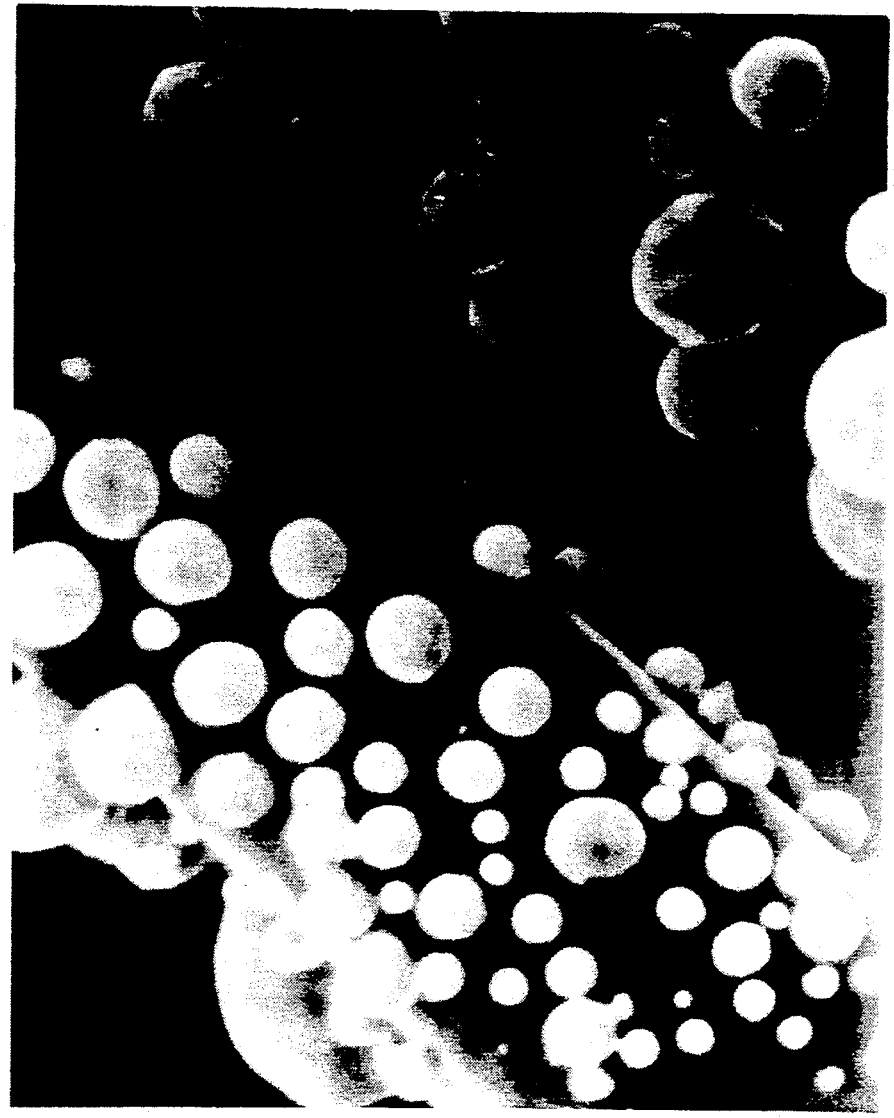
FIG. 1 is a photograph of pure copper on a graphite surface after heat treating near the melting point of copper. The copper beads up on the surface and does not wet graphite.

The present invention is directed to a fiber coatings which allow ceramic or metal fibers to be wetted by molten metals. The coatings also inhibit degradation of the physical properties of the fiber by chemical reaction between the fiber and the coating itself or between the fiber and the molten metal matrix. In addition, the coatings of the present invention do not appear to have any limiting effect upon the properties of the composite. Hence, the fiber coatings within the scope of the present invention not only improve the wettability of the fiber, but also protect the fiber from degradation.

Suitable coatings within the scope of the present invention are wet by the metal matrix. The coatings should also be inert to the fiber and have little or no solubility in the molten metal matrix, both to maintain the desired chemical or physical properties of the matrix, and to prevent gradual dewetting of the fibers by slow degradation of the coatings. In addition, the coatings should have a higher melting point than the metal matrix so that the coatings themselves do not have to wet the fibers and does not decrease the temperature range over which the resulting composites can operate.

Further, the strength of the metal matrix-coating interface and the coating-fiber interface should be strong enough to prevent fiber pull-out or other degradation of the physical properties of the composite. Finally, fiber coatings within the scope of the present invention are preferably stable in air so that sophisticated equipment to maintain special atmospheres are not needed during manufacture.

It has been found that, with one exception, refractory metals meet the foregoing objectives of a suitable coating. Refractory metals have negligible solubility in molten metals of the type used as matrix metals. Equally important they are also stable in air, have a much higher melting point than the typical matrix metals, and are typically wetted by the matrix metal. In addition, refractory metals generally form very strong bonds with the metal matrix.

Although the refractory metals have high specific gravities, a very thin layer of the refractory metal is generally sufficient for wetting. In addition, it has been found that density of the final composite generally is not adversely affected by a thin refractory metal layer. Therefore, an important feature of the fiber coatings within the scope of the present invention is a wetting layer comprising a refractory metal which can be applied to a wide variety of fiber reinforcements.

However, refractory metals often form undesirable stable carbides. Should the fiber be graphite or another carbon based fiber, then a barrier or protective layer between the refractory metal and the graphite fiber is preferred to prevent possible fiber degradation. When alumina fibers, less reactive graphite fibers, or silicon carbide fibers are used, such a protective barrier layer may not be necessary to protect the fibers from either the refractory metal layer or the molten alloy.

In view of the foregoing, a suitable barrier or protective layer should be inert to graphite or other carbon based fibers. The barrier layer should also resist diffusion through or alloying with the refractory metal layer. Likewise, the refractory metal should not diffuse through the barrier layer. In addition, the barrier layer should have a higher melting point than the metal matrix and should form strong bonds with the fiber and with the refractory metal in order to maximize the physical properties of the composites.

Because the barrier layer does not have to be wetted by the metal matrix, there are a wide range of suitable barrier layer materials. For example, depending on the choice of fiber, suitable barrier layers may include oxides (such as alumina or silica), carbides (such as silicon or titanium carbide), nitrides (such as silicon or titanium nitride), or other metals. These barrier layers are stable in air and may be readily applied to the fibers using techniques known in the art as atmospheric pressure.

Figure 2:
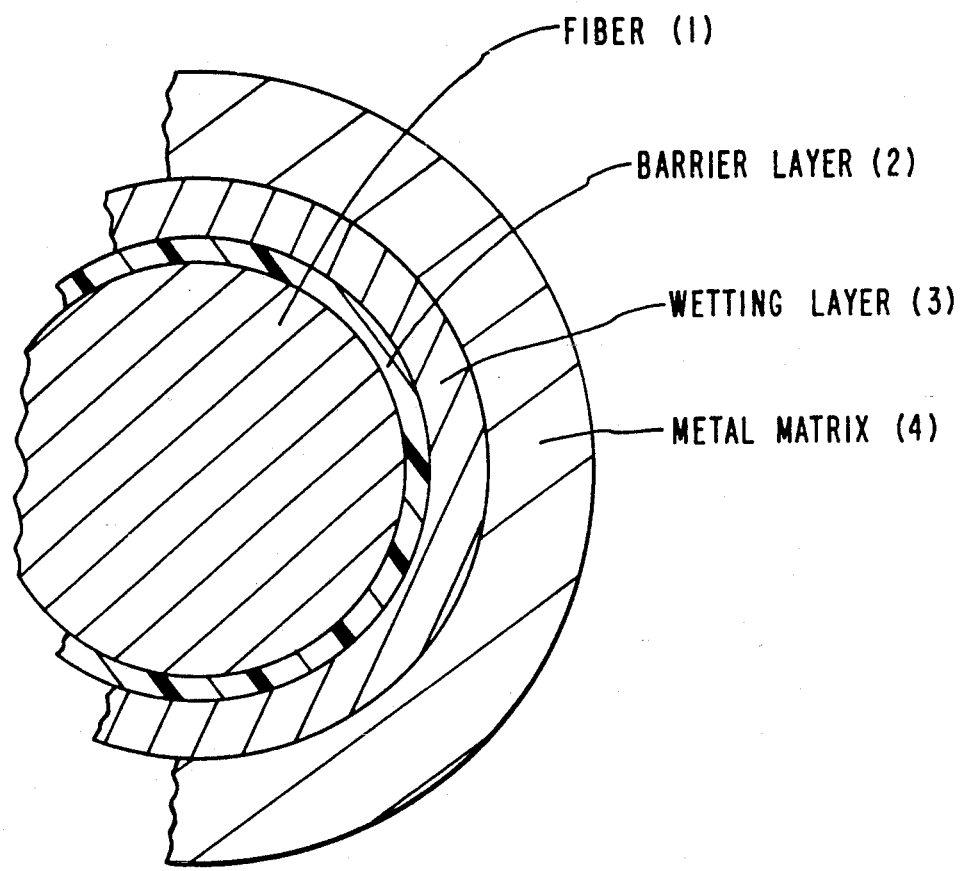
FIG. 2 is a cross sectional view of a typical coated fiber within the scope of the present invention.

Thus, the coating system within the scope of the present invention preferably includes at least a wetting layer, and in some applications, a wetting layer and a barrier layer. A schematic view of a coating system within the scope of the present invention is illustrated in FIG. 2. The relative thicknesses of the layers shown in FIG. 2 are simply figurative and should not be considered limiting in scope.

The barrier layer 2 is applied directly on the fiber 1. The barrier layer protects the fiber from the refractory metal in the wetting layer or from the molten metal matrix. It has also been found that in most cases the barrier layer tends to facilitate coating the fiber with the wetting layer.

The wetting layer is applied on top of the barrier layer. As discussed above, the wetting layer preferably includes a very thin layer of a refractory metal, e.g. molybdenum, tungsten, tantalum, and niobium. These refractory metals have a melting point higher than the typical metal matrix (e.g. copper, aluminum, magnesium, titanium, certain eliminates, and transition metal superalloys) and are generally inert with respect to the metal matrix. The refractory metal is chosen to be wet by the molten matrix alloy but to have limited solubility in the alloy. By minimizing the thickness of the refractory metal layer, weight increases of the composite due to the refractory metal layer are minimized.

The resulting composites within the scope of the present invention are useful for structural applications where their high strength and high modulus are useful (particularly aerospace applications). By varying the amount of ceramic fibers, particularly graphite fibers, in a composite, the coefficient of thermal expansion can be controlled over a fairly wide temperature range. Such composites with controlled thermal expansion may be useful as materials to join metals, ceramics, and composites.

A specific example of the present invention is to join copper to graphite for high heat flux applications. Because graphite fibers coating according to the procedures of the present invention are wetted by pure copper, composites with very high thermal conductivity will result, thereby making such composites useful for heat sink utilities.

A particular advantage of preparing parts by liquid metal infiltration is that fiber preforms, similar to the shape of the desired finished part, may be infiltrated by a process similar to casting. This allows relatively massive composite parts to be produced since the methods within the scope of the present invention may be performed. Casting to near net shape will avoid bending or forming the final composite after infiltration which may result in fracture of the reinforcement.

EXAMPLES

The use of the metal matrix coated fiber composites and the methods of manufacturing such composites within the scope of the present invention will be further clarified by a consideration of the following examples, which are intended to be exemplary of the use of the invention and should not be viewed as a limitation on any claimed embodiment.

The barrier layer can be applied to fibers by several techniques One technique which provides satisfactory results is described in Example 1.

EXAMPLE 1

A solution of aluminum sec-butoxide (commercially available from Chattum Chemicals) was dissolved in toluene to produce a solution containing about 5% solids. A fiber tow (also referred to as a "strand") of THORNEL ® P-100 graphite fibers manufactured by Amoco Performance Products, Inc., Ridgefield, Conn., was placed into the solution and then withdrawn, leaving a fairly uniform liquid layer on each fiber. The fibers were dried and then heated in argon to 325° C., which converted the aluminum sec-butoxide into aluminum oxide. The coating is much less than 0.1 micron thick because thicker coatings are more visible. The presence of the coating was confirmed in the scanning electron microscopy by x-ray dispersive spectroscopy, also referred to as "EDAX".

The fiber tow or strand consisted of 2,000 unsized graphite filaments with zero twist. The P-100 fibers are pitch based fibers having a published tensile strength of 325,000 psi and a tensile modulus of 105,000,000 psi. The filament diameter was 10 microns.

The alumina coating was less than 0.1 micron thick. It was not visible using scanning electron microscopy ("SEM") but was detected using elemental analysis. This barrier layer protected the graphite fibers from degradation by the refractory layer described below. It will be appreciated that other wet chemistry means for applying alumina or other barrier layers to fibers may exist.

As discussed above, a barrier layer may not be necessary for all fibers to be coated within the scope of the present invention. Some fibers, such as alumina fibers, are not degraded by typical refractory metals which are applied as the wetting layer. Thus, alumina fibers may be directly coated with a wetting layer.

In addition, it has been found that the barrier layer facilitates the application of wetting layers to fibers. Without a barrier layer, the fibers tend to cluster together when applying the wetting layer. As a result, it is more difficult to apply an even coating on the fibers. On the other hand, with a barrier layer, the fibers tend to be coated evenly.

In view of the foregoing, even though some fibers may not need a barrier layer to protect the fibers from degradation, a barrier layer may be applied to facilitate the application of a wetting layer.

EXAMPLE 2

Figure 3:
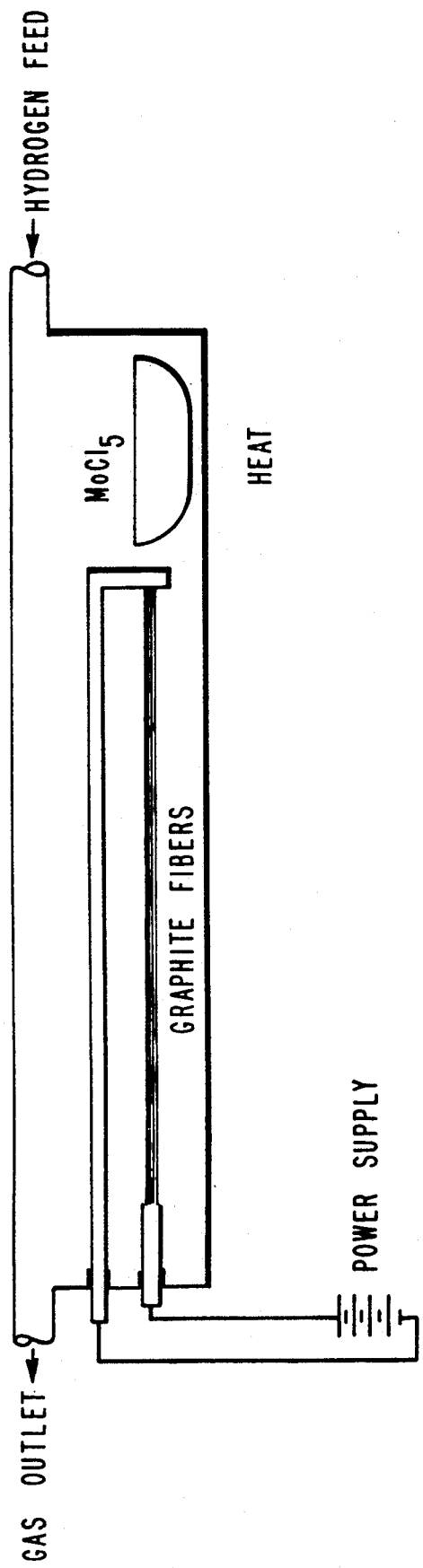
FIG. 3 is a schematic view of a chemical vapor deposition apparatus used to coat fibers with refractory metals within the scope of the present invention.

According to the procedure of Example 2, a molybdenum metal coating was applied to graphite fibers by a chemical vapor deposition ("CVD") technique. THORNEL ® P-100 graphite fibers manufactured by Amoco Performance Products, Inc., Ridgefield, Conn., were coated with an alumina barrier layer according to the procedure of Example 1. To deposit molybdenum on the coated fibers, a chemical vapor deposition apparatus was assembled as shown in FIG. 3. Molybdenum pentachloride was heated in a boat by external heaters to a temperature between 200° C. and 260° C. These temperatures roughly correspond to the melting and boiling points of molybdenum pentachloride, respectively. The fibers were then clamped in a device which allows electric current to be passed through the fibers. The ends of the fibers were coated with silver paste to improve electrical contact.

An 5 ampere electric current was passed through the fiber tow which heated the fibers to an estimated temperature of between 650° C. and 900° C. in an argon atmosphere. The temperature of the fibers was maintained by varying the current passing through the fibers. A mixture of hydrogen and vaporized molybdenum pentachloride was introduced into the vessel surrounding the heated fibers. The molybdenum pentachloride reacted with the hydrogen in the vicinity of the heated fiber, depositing molybdenum metal on the fibers.

Figure 4:
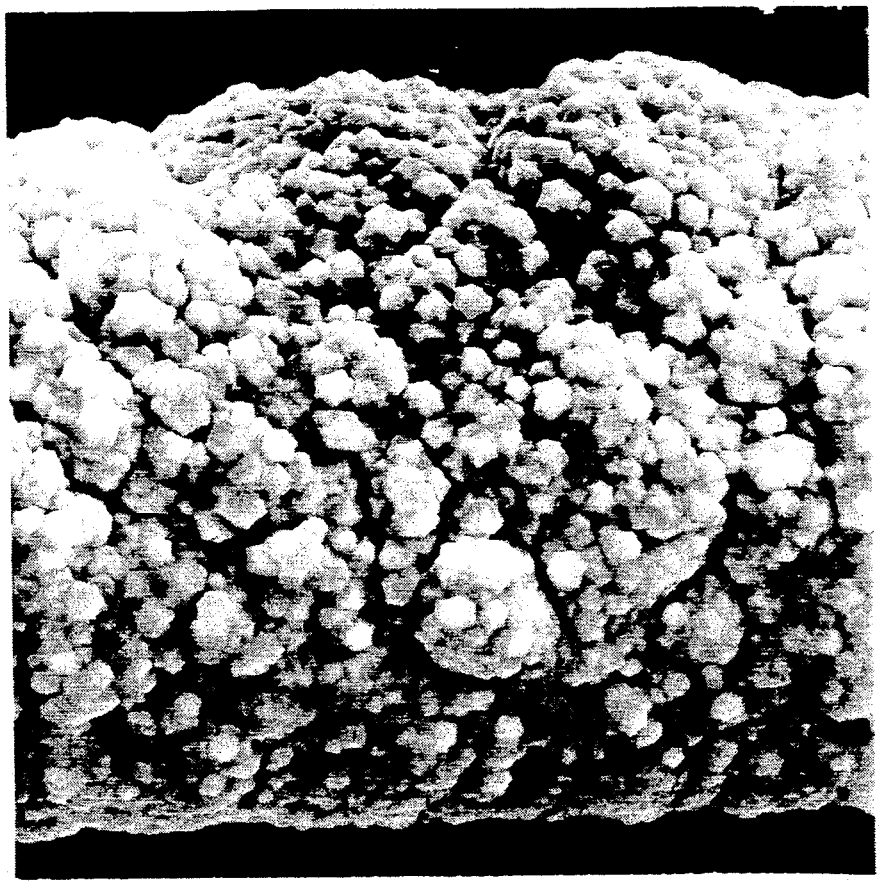
FIG. 4 is a photograph of a graphite fiber coated with molybdenum by chemical vapor deposition.

The rate of evolution of the molybdenum pentachloride could be roughly followed by monitoring the pH of the gas stream dissolved in water which exits the chemical vapor deposition reactor. At the conclusion of the deposition process, the coated fibers were examined by SEM and EDAX to confirm the presence and elemental composition of the coating. The molybdenum layer was found to have a thickness between about 0.5 and 3 microns. FIG. 4 contains a photograph of the graphite fiber coated with molybdenum. The coating thickness on this fiber is approximately 3 microns. The photograph was taken using scanning electron microscopy.

Molybdenum was selected as the refractory metal to coat the graphite fibers in Example 2 because of its high melting point and because it can be chemically vapor deposited by the hydrogen reduction of molybdenum pentachloride. The densities of molybdenum and copper are sufficiently close that the use of a molybdenum coating may meet with fewer objections in weight critical applications.

Theoretically, a tungsten coating would be a good alternative to the molybdenum. However, from a practical view point, a tungsten coating would be significantly more difficult to provide. For example, the gaseous tungsten hexafluoride from which the metal is commercially chemically vapor deposited is considerably more hazardous than is the solid molybdenum pentachloride. Tungsten is also significantly more dense than either copper or molybdenum which may render tungsten unsuitable in certain weight critical applications.

Moreover, the entire chemical vapor deposition procedure has some inherent risks which reduces its usefulness as a large scale manufacturing technique. As described above, the fibers are heated to a temperature in the range from about 700° C. to about 900° C. in the presence of a hydrogen atmosphere. Should oxygen or another oxidizing agent contaminate the controlled hydrogen atmosphere, disastrous consequences could result.

With these considerations in mind, another approach to applying a refractory metal coating to fibers was identified which would be stable in air and which would not require a controlled atmosphere.

EXAMPLE 3

According to the procedure of Example 3, a refractory metal coating was applied to graphite fibers by an electroplating technique. THORNEL ® P-100 graphite fibers manufactured by Amoco Performance Products, Inc., Ridgefield, Conn., were coated with an alumina barrier layer according to the procedure of Example 1. The fibers were then clamped in an electrically conductive fixture and placed in a solution consisting of ammonium molybdate, sulfuric acid, and sodium carbonate dissolved in water. The concentration of ammonium molybdate and sodium carbonate was 1.5 molar. The concentration of sulfuric acid was 1 part acid per 100 parts ammonium molybdate. The counter electrode was a graphite rod.

The fibers were connected as the cathode in a DC electric circuit and a current of 0.40 amperes at 2 volts was passed through the fibers for a period of 10 minutes. A black coating consisting of molybdenum was produced on the fibers.

EXAMPLE 4

In this example, a copper/graphite composite was formed. THORNEL ® P-100 graphite fibers manufactured by Amoco Performance Products, Inc., Ridgefield, Conn., were coated with an alumina barrier layer according to the procedure of Example 1 and then with a molybdenum layer according to the procedure of Example 3. The fibers were then placed in a 0.25 inch copper tube which was placed vertically in a graphite crucible and heated in a vacuum oven to 1100° C. for 5 minutes. The molten copper was drawn by capillary action into the fiber bundle, excess copper draining from the composite wire.

Upon cooling, a composite in the form of a wire was produced. The composite was fractured and examined for the extent of infiltration by both optical and electron microscopy. Scanning electron microscopy showed that the fibers were completely wet by the copper metal. Very little fiber pull-out from the copper matrix was observed, indicating that bonding between the matrix and the fibers was good. A force equivalent to a 42.4 kg weight was required to fracture the specimen, which corresponds to a tensile strength of the fibers in the composite to be 406,000 psi.

FIG. 4 is a photograph of the fracture surface of the copper/graphite composite prepared according to the procedure of Example 4. The photograph was obtained using scanning electron microscopy.

EXAMPLE 5

A copper/graphite composite was formed according to the procedure of Example 4 except that the P-100 graphite fibers were coated with a molybdenum layer according to the procedure of Example 2. The resulting copper/graphite composite was fractured and examined for the extent of infiltration by both optical and electron microscopy. Scanning electron microscopy showed that the fibers were completely wet by the copper metal. Very little fiber pull-out from the copper matrix was observed, indicating that bonding between the matrix and the fibers was good. A force equivalent to a 29.5 kg weight was required to fracture the specimen, which corresponds to a tensile strength of the fibers in the composite to be 320,000 psi.

Figure 5:
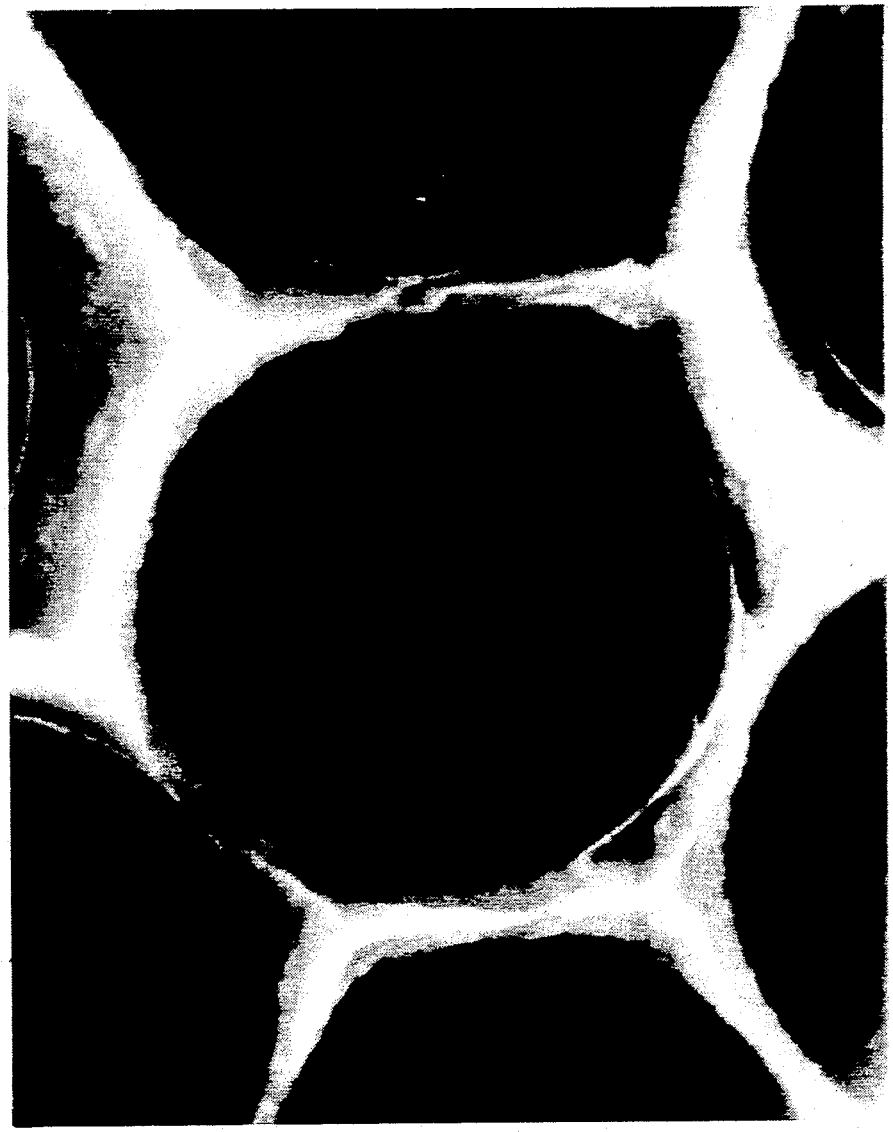
FIG. 5 is a photograph of the fracture surface of a copper/graphite composite prepared utilizing methods of the present invention by coating graphite fibers with an alumina barrier layer and a molybdenum wetting layer and then infiltrating with pure molten copper.

FIG. 5 is a photograph of the copper/graphite composite prepared according to the procedure of Example 5 showing complete infiltration of copper among the graphite fibers.

EXAMPLE 6

A copper/graphite composite was formed according to the procedure Example 5 except that Hercules HMU fibers were used instead of P-100 fibers. The Hercules HMU fiber tow or strand consisted of 3,000 graphite filaments. The fibers are polyacrylonitrile ("PAN") based fibers. They were supplied with a water soluble polyvinyl alcohol ("PVA") sizing. The Hercules HMU fibers have a published tensile strength of 400,000 psi and a tensile modulus of 55,000,000 psi. The filament diameter was 7 microns.

The resulting copper/graphite composite was fractured and examined for the extent of infiltration by both optical and electron microscopy. Scanning electron microscopy analysis of the fracture surface showed no reaction had taken place between the fibers and the matrix or coating.

EXAMPLE 9

According to the procedure of Example 9, a copper/graphite composite was formed from a woven graphite cloth. The graphite cloth was woven with THORNEL ® P-75 graphite fibers manufactured by Amoco Performance Products, Inc., Ridgefield, Conn. The fiber tow or strand of P-75 fibers consisted of 2,000 unsized graphite filaments. The P-75 fibers are pitch based fibers having a published tensile strength of 275,000 psi and a tensile modulus of 75,000,000 psi. The filament diameter was 10 microns.

A section of graphite cloth was coated with an alumina barrier layer according to the procedure of Example 1 and with a molybdenum wetting layer by electroplating according to the procedure of Example 3. The cloth was placed between sheets of pure copper sheet in a graphite die, which was heated in a vacuum to 1100° C.

Figure 6:
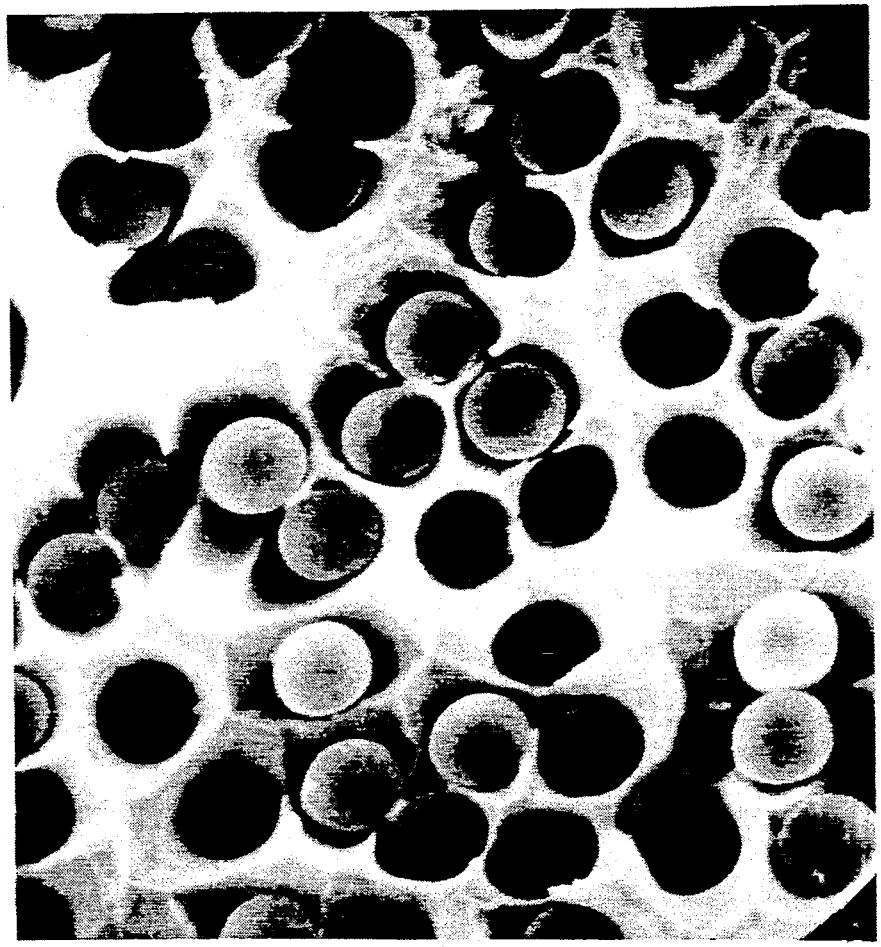
FIG. 6 is a photograph of a copper/graphite composite prepared utilizing methods of the present invention by coating graphite fibers with an alumina barrier layer and a molybdenum wetting layer and then infiltrating with pure molten copper.
Figure 7:
FIG. 7 is a photograph of a copper/graphite composite prepared utilizing methods of the present invention by coating a graphite cloth with an alumina barrier layer and a molybdenum wetting layer and then infiltrating with pure molten copper.

Upon solidification, the copper/graphite composite was sectioned and examined. The graphite cloth was completely infiltrated with the copper. The specimen had the appearance of the graphite cloth. A photograph of the specimen is shown in FIG. 6.

EXAMPLE 8

In this example, an aluminum/graphite composite was formed from a woven graphite cloth. The graphite cloth was woven with THORNEL ® P-75 graphite fibers manufactured by Amoco Performance Products, Inc., Ridgefield, Conn. The fiber tow or strand of P-75 fibers consisted of 2,000 unsized graphite filaments with zero twist. The P-75 fibers have a published tensile strength of 275,000 psi and a tensile modulus of 75,000,000 psi. The filament diameter was 10 microns.

The graphite cloth was coated with a molybdenum wetting layer by electroplating according to the procedure of Example 3. No barrier layer was applied to the graphite cloth.

The coated graphite cloth was wrapped in aluminum foil and heated in a vacuum to 900° C. Upon cooling, the cloth was completely infiltrated with aluminum metal. Scanning electron microscopy analysis showed the fibers were surrounded with apparent reaction products indicating that degradation of the fibers had occurred.

EXAMPLE 9

A copper/graphite composite was formed according to the procedure of Example 5, except that the fibers were not coated with an alumina barrier layer. Upon cooling, a composite in the form of a wire was produced. The composite was fractured and examined for the extent of infiltration by both optical and electron microscopy.

Scanning electron microscopy showed that the fibers were completely wetted by the copper metal. Very little fiber pull-out from the copper matrix was observed, indicating that bonding between the matrix and the fibers was good. A force equivalent to a 35.8 kg weight was required to fracture the specimen, which corresponds to a tensile strength of the fibers in the composite to be 350,000 psi.

EXAMPLE 10

A copper/graphite composite was formed according to the procedure of Example 6, except that the fibers were coated with nickel instead of alumina. The graphite fibers were electroplated with a coating of nickel using a commercial nickel sulphate plating bath. The nickel layer was approximately 0.3 microns. The Hercules HMU fibers were then coated with a molybdenum wetting layer according to the procedure of Example 2.

Scanning electron microscopy photographs of the resulting composite showed that the graphite fibers had extensively reacted with the matrix. Some of the fibers had been reduced from their normal 8 micron diameter to 3 microns. Presumably molybdenum carbide formed as a result of the reaction between the fiber and the molybdenum layer. Using a Kevex detector for EDAX, the protective nickel layer between the molybdenum and fiber could not be detected. In some samples, only a trace of nickel could be detected in the copper matrix.

Close examination of the molybdenum coated fiber shows that the molybdenum layer was very rough and apparently not completely continuous. During melting, the copper alloy may have penetrated voids in the molybdenum coating, dissolving away the nickel. Alternatively, the nickel may have diffused through the molybdenum. The results of Example 11 indicate that nickel does not adequately protect the graphite fiber from the molybdenum.

Figure 8:
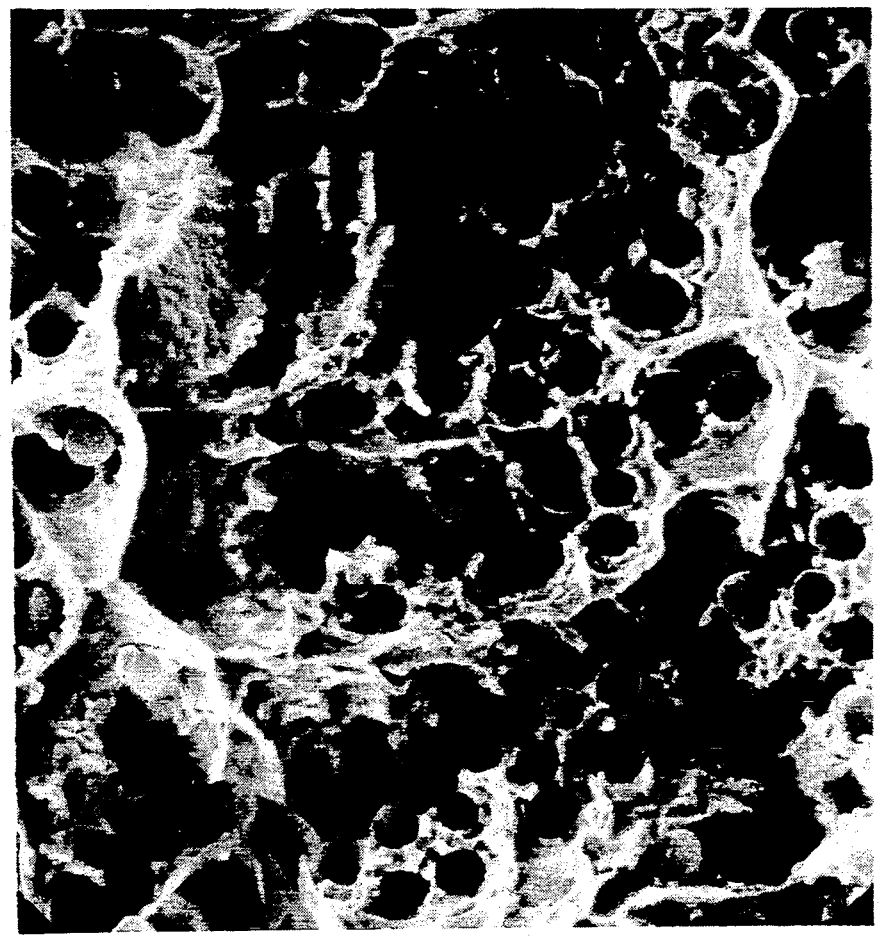
FIG. 8 is a photograph of a copper/graphite composite prepared by coating a graphite fiber with nickel followed by a layer of molybdenum. This photograph shows degradation of some of the graphite fibers.

FIG. 8 contains a photograph of the copper/graphite composite prepared according to the procedure of Example 11. Some fiber degradation can be observed. The photograph was obtained using scanning electron microscopy.

EXAMPLE 11

THORNEL ® P-100 graphite fibers manufactured by Amoco Performance Products, Inc., Ridgefield, Conn., were placed in a copper tube without any surface treatment. The fiber tow or strand consisted of 2,000 unsized graphite filaments with zero twist. The P-100 fibers are pitch based fibers having a published tensile strength of 325,000 psi and a tensile modulus of 105,000,000 psi. The filament diameter was 10 microns. The fibers were placed in a 0.25 inch copper tube which was placed horizontally in a quartz crucible and heated in a vacuum oven to 1100° C. for 5 minutes. The resulting sample consisted of graphite fibers which were not wet by the copper. As a result, no composite could be produced.

EXAMPLE 12

A copper/graphite composite is formed according to the procedure of Example 4, except that silica is substituted for alumina as the barrier layer. Examination of the resulting composite demonstrates that the graphite fibers are completely wetted by the copper metal. Very little fiber pull out is observed. Similarly, tensile strength tests indicate that there is very little fiber degradation.

EXAMPLE 13

A copper/graphite composite is formed according to the procedure of Example 4, except that tungsten is substituted for molybdenum as the wetting layer. Examination of the resulting composite demonstrates that the graphite fibers are completely wet by the copper metal. Very little fiber pull out is observed. Similarly, tensile strength tests indicate that there is very little fiber degradation.

EXAMPLE 14

An aluminum/graphite composite is formed according to the procedure of Example 8, except an alumina barrier layer is applied according to the procedure of Example 1 to protect the graphite fibers from reaction. Examination of the resulting composite demonstrates that the graphite fibers are completely wet by the aluminum metal. Very little fiber pull out is observed. Similarly, tensile strength tests indicate that there is very little fiber degradation.

EXAMPLE 15

An aluminum/graphite composite is formed according to the procedure of Example 15, except tantalum is substituted for molybdenum as a wetting layer. Examination of the resulting composite demonstrates that the graphite fibers are completely wet by the aluminum metal. Very little fiber pull out is observed. Similarly, tensile strength tests indicate that there is very little fiber degradation.

EXAMPLE 16

In this example, a copper/alumina composite is formed. Alumina fibers purchased from DuPont are electroplated with a coating of nickel using a commercial nickel sulphate plating bath. The nickel layer is approximately 0.3 microns. The nickel layer provides electrical conductivity for the fiber. The filament diameter is 20 microns. The nickel plated fibers are then coated with molybdenum by plating according to the procedure of Example 3.

The resulting fibers are placed in a 0.25 inch copper tube which is then placed vertically in a graphite crucible and heated in a vacuum oven to 1100° C. for 5 minutes. The resulting sample consists of a copper-alumina composite. The results of Example 17 illustrates that the coatings within the scope of the present invention may be used with other fibers besides graphite.

EXAMPLE 17

In this example, an aluminum/alumina composite is formed. Alumina fibers purchased from DuPont are electroplated with a coating of nickel using a commercial nickel sulphate plating bath. The nickel layer is approximately 0.3 microns. The nickel layer provides electrical conductivity for the fiber. The nickel plated fibers are then coated with molybdenum by plating according to the procedure of Example 3.

The coated alumina fibers are wrapped in aluminum foil and heated in a vacuum to 900° C. Examination of the resulting aluminum/alumina composite demonstrates that the alumina fibers are completely infiltrated with aluminum metal.

EXAMPLE 19

In this example, a tungsten/nickel superalloy composite is formed. High strength tungsten fibers are coated with an alumina barrier layer according to the procedure of Example 1 and with a tungsten wetting layer according to the procedure of Example 3. The tungsten fibers are then clamped in an electrically conductive fixture and placed heated by passing an electric current through them in a vessel filled with argon. A mixture of hydrogen and tungsten hexafluoride are admitted to the vessel. A film of tungsten is deposited on the surface of the fibers.

The coated fibers are then placed in a tube of nickel alloy which is heated to the melting point of the alloy. Upon cooling, a composite consisting of tungsten fibers embedded in a nickel alloy is produced. Analysis of the resulting nickel superalloy/tungsten composite shows that the tungsten fibers retain their high temperature strength. No sign of fiber degradation is observed.

SUMMARY

Fibers coated with a barrier layer and a wetting layer have been successfully infiltrated with a metal matrix. A comparison of FIGS. 1 and 5 clearly show the effectiveness of the coating processes within the scope of the present invention in improving wetting of graphite fibers by pure copper. The coated fibers are stable in air. Bonding between the fibers and the matrix appear to be excellent, and would lead us to believe that the physical properties will closely follow theoretical predictions.

Modifications to the fiber surface may increase the strength of the bonding between the coating and the fiber (currently the coating strips away from the fiber). The metal matrix alloy chemistry may be adjusted to decrease solubility of the refractory metal in the molten matrix.

The matrix chemistry may be adjusted to increase the strength of the matrix over that of the pure metals presented here. Both precipitation and solution strengthening may be useful.

From the foregoing it will be appreciated that the present invention to provides metal matrix coated fiber composites and methods of manufacturing such composites in which the fibers are not degraded during processing, the process and various components are stable in air, the process operates at atmospheric pressure, and the process in amenable to standard metal casting techniques.

Additionally, the present invention provides metal matrix coated fiber composites and methods of manufacturing such composites in which the fiber is coated with a refractory metal layer (1) which is readily wetted by the metal matrix, (2) which is substantially inert to the fiber, (3) which would have a higher melting point than the metal matrix so that the coating itself does not have to wet the fiber and does not decrease the temperature range over which the resulting composite can operate, (4) which has little or no solubility in the metal matrix, both to maintain the desired chemical properties of the metal matrix, as well as to prevent gradual dewetting of the fibers by slow degradation of the coating, (5) which has a strong bond to both the fiber and the metal matrix to prevent fiber pull-out or other degradation of the physical properties of the resulting composite, and (6) which is stable in air.

Likewise, the present invention provides metal matrix coated fiber composites and methods of manufacturing such composites in which the fiber is coated with a barrier layer (1) which is inert to the fiber, (2) which resists diffusion through or alloying with the refractory metal layer and inhibits diffusion of the refractory metal therethrough, and (3) which has good bonding between the fiber and the refractory metal in order to maximize the physical properties of the composite.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. Metal matrix composites comprising:
   a metal matrix; and
   a plurality of fibers infiltrated with the metal matrix, said fibers being coated with a coating comprising:
   a wetting layer applied about the periphery of said fibers comprising a refractory metal which is readily wetted by the metal matrix and which is substantially insoluble in the metal matrix, said wetting layer being stable in air, and said wetting layer having a melting point higher than the melting point of the metal matrix; and
   a barrier layer for protecting said fibers from degradation caused by chemical reaction with the wetting layer or with the metal matrix, said barrier layer being applied to the periphery of each of said fibers between said fiber and the wetting layer and said barrier layer being stable in air.

2. Metal matrix composites as defined in claim 1, wherein the wetting layer comprises molybdenum.

3. Metal matrix composites as defined in claim 1, wherein the wetting layer comprises tungsten.

4. Metal matrix composites as defined in claim 1, wherein the barrier layer comprises alumina.

5. Metal matrix composites as defined in claim 1, wherein the barrier layer comprises silica.

6. Metal matrix composites as defined in claim 1, wherein the metal matrix comprises copper.

7. Metal matrix composites as defined in claim 1, wherein the metal matrix comprises aluminum.

8. Metal matrix composites as defined in claim 1, wherein the metal matrix comprises magnesium.

9. Metal matrix composites as defined in claim 1, wherein the metal matrix comprises titanium.

10. Metal matrix composites as defined in claim 1, wherein the metal matrix comprises an aluminide.

11. Metal matrix composites as defined in claim 1, wherein the metal matrix comprises a transition metal superalloy.

12. Metal matrix composites as defined in claim 1, wherein the plurality of fibers comprise ceramic fibers.

13. Metal matrix composites as defined in claim 12, wherein the plurality of fibers comprise graphite fibers.

14. Metal matrix composites as defined in claim 1, wherein the plurality of fibers comprise metal fibers.

15. A fiber coating for a fiber used in a metal matrix composite comprising:
    a wetting layer applied about the periphery of a fiber comprising a refractory metal which is readily wetted by a metal matrix and which is substantially insoluble in the metal matrix, said wetting layer being substantially stable in air, and said wetting layer having a melting point higher than the melting point of the metal matrix; and
    a barrier layer applied to the periphery of the fiber between the fiber and the wetting layer for protecting the fiber from degradation caused by chemical reaction with the wetting layer or with the metal matrix, said barrier layer being stable in air.

16. A method for forming a metal matrix composites comprising the steps of:
    (a) obtaining a plurality of fibers;
    (b) applying a barrier layer to the periphery of each of the fibers, said barrier layer protecting the fibers from degradation and said barrier layer being stable in air;
    (c) coating the barrier layer with a wetting layer comprising a refractory metal which is readily wet by a metal matrix and which is substantially insoluble in the metal matrix, said wetting layer having a melting point higher than the metal matrix and said wetting layer being stable in air; and
    (d) infiltrating the fibers with molten matrix metal thereby resulting in a metal matrix composite.

17. A method for forming metal matrix composites as defined in claim 16, wherein the wetting layer is applied by the process of chemical vapor deposition.

18. A method for forming metal matrix composites as defined in claim 16, wherein the wetting layer is applied by the process of electroplating.

* * * * *

UNITED STATES PATENT AND TRADEMARK OFFICE
CERTIFICATE OF CORRECTION

PATENT NO. : 5,244,748
DATED : September 14, 1993
INVENTOR(S) : JOSEPH K. WEEKS, JR. et al.

It is certified that error appears in the above-indentified patent and that said Letters Patent is hereby corrected as shown below:

```
Column 1, line 56, after "ceramics" insert --.--
Column 1, line 63, after "carbide," insert --and--
Column 5, line 16, "in" should be --is--
Column 6, line 61, "in" should be --is--
Column 7, line 63, delete "a"
Column 9, line 67, after "techniques" insert --.--
Column 13, line 6, "Example 9" should be --Example 7--
Column 13, line 7, "Example 9" should be --Example 7--
Column 14, line 68, "pull out" should be --pullout--
Column 15, line 11, "pull out" should be --pullout--
Column 15, line 17, "Example 15" should be --Example 14--
Column 15, line 21, "pull out" should be --pullout--
Column 15, line 40, "Example 17" should be --Example 16--
Column 15, line 59, "EXAMPLE 19" should be --EXAMPLE 18--
Column 16, line 37, "in" should be --is--
```

Signed and Sealed this

Twenty-eighth Day of June, 1994

*Attest:*

BRUCE LEHMAN

*Attesting Officer*    *Commissioner of Patents and Trademarks*